United States Patent [19]

Aoki

[11] Patent Number: 4,716,959
[45] Date of Patent: Jan. 5, 1988

[54] ALUMINUM HEAT EXCHANGERS AND METHOD FOR PRODUCING THE SAME

[75] Inventor: Hisao Aoki, Gunma, Japan

[73] Assignee: Sanden Corporation, Gunma, Japan

[21] Appl. No.: 644,816

[22] Filed: Aug. 27, 1984

[51] Int. Cl.[4] .............................................. F28D 1/02
[52] U.S. Cl. .................................... 165/152; 165/905
[58] Field of Search .................... 29/157.3 B; 165/152, 165/134.1, 905

[56] References Cited

U.S. PATENT DOCUMENTS

| | | | |
|---|---|---|---|
| 2,778,606 | 1/1957 | Lloyd et al. | 165/153 X |
| 3,147,800 | 9/1964 | Tadewald | 165/152 X |
| 3,489,448 | 1/1970 | Nagara et al. | 165/152 X |
| 3,857,164 | 12/1974 | Chartet | 165/152 X |
| 4,214,925 | 7/1980 | Arita et al. | 29/157.3 B X |
| 4,317,484 | 3/1982 | Tanabe et al. | 165/134.1 |
| 4,410,036 | 10/1983 | Kanada et al. | 165/134.1 |

FOREIGN PATENT DOCUMENTS

| | | | |
|---|---|---|---|
| 2178784 | 11/1973 | France | 29/157.3 R |
| 22870 | 2/1982 | Japan | 278/183 |
| 97820 | 6/1982 | Japan | 29/157.3 R |
| 1390511 | 4/1975 | United Kingdom | 165/152 |

Primary Examiner—Albert W. Davis, Jr.
Assistant Examiner—Peggy Neils
Attorney, Agent, or Firm—Hopgood, Calimafde, Kalil, Blaustein & Judlowe

[57] ABSTRACT

A serpentine-type aluminum heat exchanger comprising a serpentine-anfractuous flat tube of an aluminum alloy and a plurality of corrugated fin units made of an aluminum alloy having a high aluminum content of 99 wt. % or more, and joined to the flat tube by brazing metal coating layers fixed onto flat surfaces of parallel portions of the serpentine-anfractuous flat tube. The heat exchanger is produced by preparing the serpentine-anfractuous flat tube of an aluminum alloy, the corrugated fin units and foil plates of an aluminum alloy brazing filler metal, disposing the fin units in spaces between adjacent ones of parallel portions of the serpentine-anfractuous flat tube with foil plates being interposed between respective fin units and opposite parallel portions of the flat tube, and heating the flat tube, the fin units and foil plates in the assembled relation to the brazing temperature.

7 Claims, 4 Drawing Figures

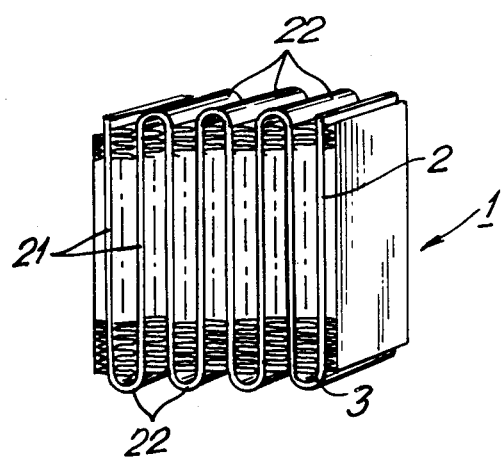
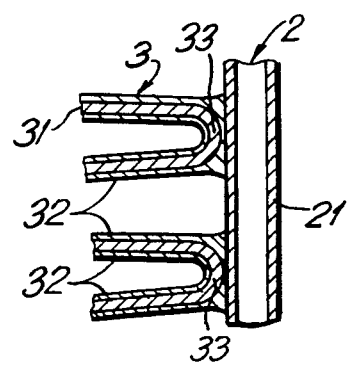
PRIOR ART
FIG. 1
PRIOR ART
FIG. 2
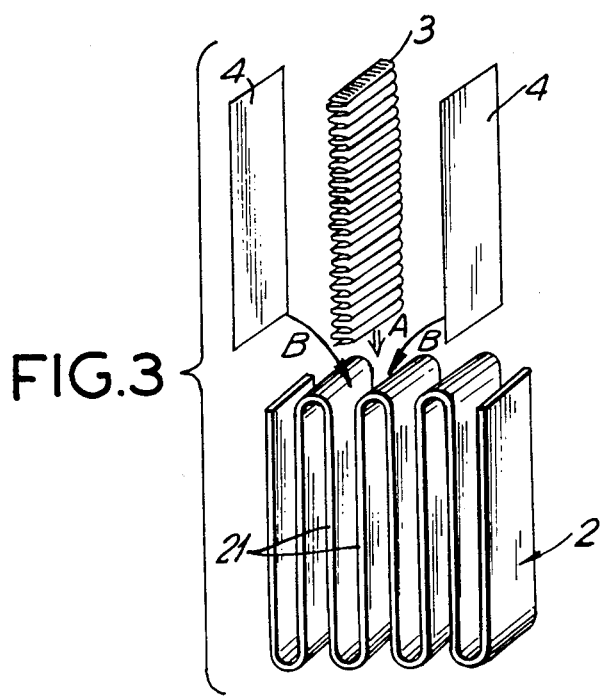
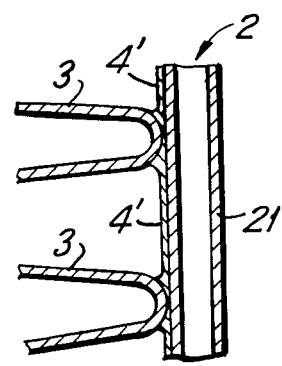
FIG.3
FIG.4

ALUMINUM HEAT EXCHANGERS AND METHOD FOR PRODUCING THE SAME

BACKGROUND OF THE INVENTION

1. Field of the Invention

The present invention relates to aluminum heat exchangers of a serpentine type having a serpentine-anfractuous flat aluminum metal tube and a plurality of corrugated aluminum metal fin units, and in particular, to such heat exchangers adaptable for refrigerant evaporators in an air conditioning system.

2. Description of the Prior Art

Heat exchangers of the serpentine type have been used for, for example, a refrigerant evaporator in an automotive air conditioning system, as shown in, for example, U.S. Pat. Nos. 4,350,025 and 4,353,224.

The serpentine-type heat exchanger comprises a flat metal tube having a refrigerant passageway or parallel passageways therein extending in a longitudinal direction of the tube. The flat tube is bent to weave up and down, or formed in a serpentine-anfractuous shape, and therefore, has a plurality of parallel portions spaced apart from one another and a plurality of U-shaped curved portions connecting adjacent ones of the parallel portions, respectively. A plurality of corrugated fin units are disposed in spaces between adjacent ones of the parallel portion of the tube and are joined thereto by brazing. Each of the corrugated fin units is formed by bending a thin plate in a corrugated form so that a number of crests are formed in opposite side surfaces of the unit alternatively. The crests in the opposite sides of the unit are joined by brazing to flat side surfaces of the opposite parallel portions of the tube.

As high heat-conductivity materials for the flat tube and the fin units, aluminum metals including aluminum and aluminum alloy are usually used. Such heat exchangers using aluminum metals are referred to as aluminum heat exchanger.

In a known serpentine-type aluminum heat exchanger, the serpentine-anfractuous flat tube is usually made of an aluminum metal having 99 wt. % or more Al, for example, AA 1050 (which comprises, by weight, 0.25% or less Si, 0.40% or less Fe, 0.05% or less Cu, 0.05% or less Mn, 0.05% or less Mg, 0.05% or less Zn, 0.03% or less Ti and 99.50% or more Al). While, an aluminum alloy brazing sheet is used for preparing the corrugated fin unit member, which has a core metal of AA 3003 (which comprises, by weight, 0.6% or less Si, 0.7% or less Fe, 0.05–0.20% Cu, 1.0–0.5% Mn, 0.10% or less Zn and the balance Al) with a cladding of an aluminum alloy brazing filler metal, such as AA 4343, 4045 or 4047 (which comprises, by weight, 0.30% or less Cu, 5–13% Si, 0.8% or less Fe, 0.15% or less Mn, up to 0.1%Mg, 0.20% or less Zn, up to 0.20% Ti, and the balance substantially Al). The brazing sheet is formed in a form of the corrugated fin unit, and the fin unit members thus formed are disposed in spaces between adjacent ones of parallel portions of the flat tube so that the crests in the opposite sides of each fin unit member are in contact with the opposite parallel portions of the flat tube. Then, the flat tube and fin unit members are heated in the assembled relation to a brazing temperature of about 600° C., and are joined by brazing.

In the known serpentine-type aluminum heat exchanger, the flat tube tends to suffer from pittings by corrosion because the aluminum alloy AA 1050 of the flat tube is baser in the corrosion potential than the aluminum alloy AA 3003 of the fin unit material. However, use of another aluminum metal having a corrosion potential equal to, or baser than, that of the flat tube for the core metal of the brazing sheet results in deformation of the fin units during the brazing operation, because elements of the aluminum alloy brazing filler metal diffuse into the core alloy during the brazing operation to lower the melting point of the core metal. Further, the core metal becomes nobler than the flat tube as another result of the diffusion, so that the flat tube still tends to suffer from the pittings.

Moreover, the use of the brazing sheet results in high cost of the heat exchanger.

Furthermore, in the known serpentine-type aluminum heat exchanger, the fin unit has a coating of the aluminum alloy brazing metal layer which is lower in the heat conductivity than the core metal and the flat tube. This means that the aluminum alloy brazing metal layer on the fin unit degrades the heat exchanging property of the exchanger.

SUMMARY OF THE INVENTION

It is an object of this invention to provide a serpentine-type aluminum heat exchanger wherein a serpentine flat tube for a refrigerant conduit is prevented from pitting due to a difference between corrosion potentials of the flat tube and fin units.

It is another object of this invention to provide a serpentine-type aluminum heat exchanger having an improved heat exchanging property.

It is still another object of this invention to provide a serpentine-type aluminum heat exchanger which is low in cost.

It is yet another object of this invention to provide a method for producing the improved serpentine-type aluminum heat exchanger.

The present invention relates to an aluminum heat exchanger comprising a flat aluminum metal tube which is provided with at least one refrigerant passageway therein and formed in a serpentine-anfractuous shape in a longitudinal direction of the tube to have a plurality of a parallel portions spaced apart from one another, and a plurality of aluminum metal fin units each having a corrugated configuration, the fin units being interposed between adjacent ones of the parallel portions of the flat tube and being joined by brazing to the parallel portions of the flat tube. The present invention is characterized in that each of the fin units is made of a first aluminum metal plate having a high aluminum content of 99 wt. % or more Al, the first aluminum metal is exposed on a surface of the each fin unit, an aluminum brazing metal layer being formed over the entire surface of each of the parallel portions of the flat tube, each fin unit being joined by the aluminum brazing metal layer to the flat tube.

Preferably, AA 1050 aluminum alloy may be used for the luminum metal of the fin unit, which comprises, by weight, 0.25% or less Si, 0.40% or less Fe, 0.05% or less Cu, 0.05% or less Mn, 0.05% or less Mg, 0.05% or less Zn, 0.03% or less Ti and 99.50% or more Al.

The flat tube may be preferably made of a second aluminum metal having a corrosion potential which is substantially equal to, or nobler than, that of the first aluminum alloy of the fin units. As the second aluminum metal, the above-described AA 1050, or AA 3003 which comprises, by weight, 0.6% or less Si, 0.7% or less Fe, 0.05–0.20% Cu, 1.0–1.5% Mn, 0.10% or less Zn and the balance Al, may be used.

An aluminum alloy brazing filler metal, such as AA 4343, 4045, or 4047, which comprises, by weight, 0.3% or less Cu, 5–13% Si, 0.8% or less Fe, 0.15% or less Mn, up to 0.1% Mg, 0.2% or less Zn, and the balance substantially Al, may be used for the aluminum brazing metal layer.

In the aluminum heat exchanger according to the present invention, the flat tube is protected from pittings due to the difference between the corrosion potentials of the flat tube and the fin units, because the flat tube is substantially nobler in the corrosion potential than that of the fin units and because the surface of the flat tube is coated with the aluminum brazing metal layer. Further, since the first aluminum metal is excellent in the heat conductivity, the heat exchanging property is improved in comparison with the known aluminum heat exchanger.

The aluminum heat exchanger according to the present invention is produced by a method which comprises preparing the serpentine-anfractuous flat tube of the second aluminum metal and the corrugated fin units of the first aluminum metal, disposing the corrugated fin units in spaces between the parallel portions of the serpentine-anfractuous flat tube, respectively, with foil plates of the aluminum alloy brazing filler metal being interposed between respective corrugated fin units and the parallel portions opposing thereto, and heating the flat tube, fin units and the aluminum alloy brazing filler metal foil plates in the assembled relation to a brazing temperature for joining the fin units and the flat tube and for providing a coating layer of the brazing metal on a surface of each parallel portion of the flat tube.

Further objects, features and other aspects of the present invention will be understood from the following detailed description referring to the accompanying drawings.

BRIEF DESCRIPTION OF THE DRAWINGS

FIG. 1 is a perspective view of a typical serpentine-type heat exchanger;

FIG. 2 is a cross sectional view of a portion of a known aluminum serpentine-type heat exchanger;

FIG. 3 is a perspective view for illustrating an assembling process of parts according to the present invention; and FIG. 4 is a cross sectional view of a main portion of an embodiment of the present invention.

DETAILED DESCRIPTION OF THE PREFERRED EMBODIMENTS

Referring to FIG. 1, a typical serpentine-type heat exchanger 1 comprises a flat metal tube 2. Flat metal tube 2 is provided with a refrigerant passageway or parallel passageways therein extending in a longitudinal direction of the tube, and is bent to weave up and down, or formed in a serpentine-anfractuous shape. Therefore, the flat tube 2 has a plurality of parallel portions 21 spaced apart from one another and a plurality of U-shaped curved portions 22 connecting adjacent ones of parallel portions 21, respectively. A plurality of corrugated fin units 3 are disposed in the spaces between adjacent ones of the parallel portions 21 of flat tube 2 and are joined thereto by brazing.

Referring to FIG. 2, each fin unit 3 of a known aluminum serpentine-type heat exchanger is formed of a brazing sheet having a core metal 31 of an aluminum alloy such as AA 3003 with claddings 32 of AA 4343 or AA 4045. Crest portions 33 in the opposite sides of each corrugated fin unit 3 are in contact with, and joined by brazing, to opposite flat surfaces of parallel portions 21 of flat tube of, such as AA 1050.

The known aluminum heat exchanger has problems that the flat tube 2 tends to suffer from pittings, that a high heat exchanging property is not so sufficiently attained, and that the cost of the exchanger is high, as described above.

The present invention attempts to dissolve such problems.

Referring to FIG. 3, a serpentine-anfractuous flat tube 2 of an aluminum alloy is prepared similar to the flat tube in a known heat exchanger. While, corrugated fin units 3 are prepared from plates of an aluminum alloy having a high aluminum content of 99 wt. % or more without any brazing filler metals. Therefore, the aluminum alloy is exposed on the fin surface. Foil plates 4 are also prepared from an aluminum alloy brazing filler metal which has a melting point of about 600° C. lower than that of either one of flat tube 2 and fin unit 3 and is adaptable for brazing flat tube 2 and fin units 3.

Each fin unit 3 is disposed in a space between adjacent ones of parallel portions 21 of flat tube 2, with foil plates 4 being interposed between fin unit 3 and opposite parallel portions 21 of flat tube 2, as indicated by arrows A and B in FIG. 3.

Flat tube 2, fin units 3 and foil plates 4 are heated in the assembled relation to a brazing temperature above the melting point of the foil plates 4 for joining fin units 3 and flat tube 2.

After cooled, fin units 3 and flat tube 2 are joined to one another through the brazing metal layer 4', as shown in FIG. 4.

Since foil plate 4 of aluminum alloy brazing filler metal is used between each fin unit 3 and an opposite flat surface of parallel portion 21 of flat tube 2, the flat surface of each parallel portion 21 of flat tube 2 is entirely coated with the brazing metal layer 4'. Therefore, flat tube 2 is protected by the coating layers 4' from pittings due to the difference between corrosion potentials of the fin material and the flat tube material.

According to the above-described method of the present invention, since no brazing sheet is used for fin units, cost of the heat exchanger is lowered, as well as an aluminum alloy having a high aluminum content such as 99 wt. % or more Al, which has a high heat conductivity, is also used for fin units 3 so that the heat exchanging property can be improved.

In the aluminum heat exchanger according to the present invention, an aluminum alloy having a high aluminum content of 99 wt. % or more, is used for corrugated fin unit 3, and serpentine-anfractuous flat tube 2 is made of an aluminum alloy having a corrosion potential substantially equal to, or nobler than, that of the fin material. An aluminum alloy brazing filler metal such as AA 4343 (which comprises, by weight, 0.25% or less Cu, 6.8–8.2% Si, 0.8% or less Fe, 0.10% or less Mn, 0.20% or less Zn, and the balance substantially Al), 4045 (which comprises, by weight, 0.30% or less Cu, 9.0–11.0% Si, 0.8% or less Fe, 0.05% or less Mn, 0.05% or less Mg, 0.10% or less Zn, 0.20% or less Ti, and the balance substantially Al), or 4047 (which comprises, by weight, 0.30% or less Cu, 11.0–13.0% Si, 0.8% or less Fe, 0.05% or less Mn, 0.10% or less Mg, 0.20% or less Zn, and the balance substantially Al) is used for foil plate 4.

Several examples will be demonstrated below.

EXAMPLE 1

| Flat tube | AA 1050 |
|---|---|
| Fin units | AA 1050 |
| Foil plates | AA 4045 |

EXAMPLE 2

| Flat tube | AA 1100* |
|---|---|
| Fin units | AA 1050 |
| Foil plates | AA 4045 |

*AA 1100 comprises, by weight, 1.0% or less of total amount of Si and Fe, 0.05-0.20% Cu, 0.05% or less Mn, 0.10% or less Zn, and 99.00% or more Al.

EXAMPLE 3

| Flat tube | AA 3003 |
|---|---|
| Fin units | AA 1050 |
| Foil plates | AA 4343 |

In Example 1 or 2, AA 4343 or AA 4047 can be used for foil plates, and in Example 3, AA 4045 or AA 4047 can be used for foil plates.

What is claimed is:

1. In an aluminum heat exchanger comprising a flat aluminum metal tube which is provided with at least one refrigerant passageway therein and having a serpentine-anfractuous shape in a longitudinal direction of the tube characterized by a plurality of parallel portions spaced apart from one another, each of said parallel portions having interposed therebetween a fin unit of aluminum metal of corrugated configuration, each of said fin units of corrugated shape being brazed to each of said parallel portions of said flat tube, the improvement wherein each of said fin units is made of a first aluminum alloy having a high aluminum content of at least 99 wt. %, the surface of each of said aluminum fin units being exposed and substantially free of brazing alloy, and wherein said flat tube is made of a second aluminum alloy which has a corrosion potential at least equal or more noble than the first aluminum alloy, only the surface of each of said parallel portions being covered by separate aluminum brazing alloy-sheet to thereby end braze each of said fin units onto said flat tube.

2. The aluminum heat exchanger as claimed in claim 1, wherein said flat tube is made of a second aluminum alloy having a corrosion potential substantially equal to that of said first aluminum alloy.

3. The aluminum heat exchanger as claimed in claim 1, wherein said flat tube is made of a second aluminum alloy having a corrosion potential nobler than that of said first aluminum alloy.

4. The aluminum heat exchanger as claimed in claim 1 wherein said second aluminum alloy has a high aluminum content of 99 wt. % or more.

5. The aluminum heat exchanger as claimed in claim 4, wherein said first and second aluminum alloys are an aluminum alloy comprising 0.25 wt. % or less Si, 0.40 wt. % or less Fe, 0.05 wt. % or less Cu, 0.05 wt. % or less Mn, 0.05 wt. % or less Mg, 0.05 wt. % or less Zn, 0.03 wt. % or less Ti and 99.50 wt. % or more Al.

6. The aluminum heat exchanger as claimed in claim 3, wherein said second aluminum alloy comprises 0.6 wt. % or less Si, 0.7 wt. % or less Fe, 0.05-0.20 wt. % Cu, 1.0-1.5 wt. % Mn, 0.10 wt. % or less Zn and the balance Al.

7. The aluminum heat exchanger as claimed in claim 1, wherein said aluminum brazing metal layer is made of an aluminum alloy which comprises 0.3 wt. % or less Cu, 5-3 wt. % Si, 0.8 wt. % or less Fe, 0.15 wt. % or less Mn, up to 0.1 wt. % Mg, 0.2 wt. % or less Zn, and the balance substantially Al and wherein the second aluminum alloy contains at least 99% Al.

* * * * *

UNITED STATES PATENT AND TRADEMARK OFFICE
CERTIFICATE OF CORRECTION

PATENT NO. : 4,716,959

DATED : January 5, 1988

INVENTOR(S) : Hisao Aoki

It is certified that error appears in the above-identified patent and that said Letters Patent is hereby corrected as shown below:

The expression in claim 7, column 6, line 36, to wit:

"5-3 wt.% Si" should read -- 5-13 wt.% Si -- .

Signed and Sealed this

Thirteenth Day of December, 1988

*Attest:*

DONALD J. QUIGG

*Attesting Officer*    *Commissioner of Patents and Trademarks*